(12) United States Patent
Kim et al.

(10) Patent No.: US 10,717,337 B2
(45) Date of Patent: Jul. 21, 2020

(54) HEAT PUMP SYSTEM FOR VEHICLE

(71) Applicant: Hyundai Motor Company, Seoul (KR)

(72) Inventors: Jae Yeon Kim, Hwaseong-si (KR);
Yeon Ho Kim, Seoul (KR);
Myunghwan Kim, Hwaseong-si (KR);
Wan Je Cho, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 475 days.

(21) Appl. No.: 15/348,041

(22) Filed: Nov. 10, 2016

(65) Prior Publication Data

US 2017/0361677 A1    Dec. 21, 2017

(30) Foreign Application Priority Data

Jun. 20, 2016   (KR) .................. 10-2016-0076562

(51) Int. Cl.
*B60H 1/00* (2006.01)
*H01M 10/625* (2014.01)
(Continued)

(52) U.S. Cl.
CPC ..... *B60H 1/00278* (2013.01); *B60H 1/00385* (2013.01); *B60H 1/00885* (2013.01);
(Continued)

(58) Field of Classification Search
CPC ............ B60H 1/00278; B60H 1/00885; B60H 1/00385; B60H 2001/003; F25B 25/005; B60L 58/24

See application file for complete search history.

(56) References Cited

U.S. PATENT DOCUMENTS 6,357,541 B1   3/2002 Matsuda et al.
6,705,101 B2   3/2004 Brotz et al.
(Continued)

FOREIGN PATENT DOCUMENTS

CN   1737467 A    2/2006
CN   104833129 A   8/2015
(Continued)

OTHER PUBLICATIONS

Machine Translation for WO 2015010907.*

*Primary Examiner* — Len Tran
*Assistant Examiner* — Jenna M Hopkins
(74) *Attorney, Agent, or Firm* — Morgan, Lewis & Bockius LLP (57) ABSTRACT

A heat pump system for a vehicle may include a battery cooling line that is connected with a battery module and in which coolant moves; a chiller that is connected with the battery cooling line through a first connection line to adjust a temperature of coolant by selectively exchanging a heat of a refrigerant and coolant injected therein and that is connected with a refrigerant line of an air-conditioner device through a second connection line; an electric unit device cooler including a radiator and a first water pump that are connected through a cooling line to circulate coolant for cooling a motor and an electronic unit and that is selectively connectable with the battery cooling line and the first connection line through a first valve; and a bypass line selectively connecting the second connection line and the refrigerant line through a second valve provided in the refrigerant line.

13 Claims, 6 Drawing Sheets

(51) Int. Cl.
| | |
|---|---|
| *H01M 10/663* | (2014.01) |
| *B60H 1/14* | (2006.01) |
| *H01M 10/613* | (2014.01) |
| *H01M 10/667* | (2014.01) |
| *H01M 10/6568* | (2014.01) |
| *B60H 1/32* | (2006.01) |
| *B60L 58/24* | (2019.01) |
| *F25B 25/00* | (2006.01) |

(52) U.S. Cl.
CPC ......... *B60H 1/00921* (2013.01); *B60H 1/143* (2013.01); *B60H 1/32281* (2019.05); *B60L 58/24* (2019.02); *F25B 25/005* (2013.01); *H01M 10/613* (2015.04); *H01M 10/625* (2015.04); *H01M 10/6568* (2015.04); *H01M 10/663* (2015.04); *H01M 10/667* (2015.04); *B60H 2001/003* (2013.01); *B60H 2001/00928* (2013.01); *B60H 2001/00961* (2019.05); *H01M 2220/20* (2013.01)

(56) References Cited

U.S. PATENT DOCUMENTS

| | | | |
|---|---|---|---|
| 7,063,137 B2 * | 6/2006 | Kadle | B60H 1/00878 165/202 |
| 7,147,071 B2 | 12/2006 | Gering et al. | |
| 7,797,954 B2 | 9/2010 | Duhme et al. | |
| 7,890,218 B2 | 2/2011 | Adams et al. | |
| 7,975,757 B2 | 7/2011 | Nemesh et al. | |
| 8,215,432 B2 | 7/2012 | Nemesh et al. | |
| 8,402,776 B2 | 3/2013 | Johnston et al. | |
| 9,643,473 B2 * | 5/2017 | Kang | B60H 1/3207 |
| 9,810,465 B2 * | 11/2017 | Kang | F25B 5/00 |
| 9,834,063 B2 * | 12/2017 | Kang | B60H 1/00899 |
| 9,855,821 B2 * | 1/2018 | Kang | F25B 5/00 |
| 2001/0013409 A1 * | 8/2001 | Burk | B60H 1/025 165/240 |
| 2002/0043413 A1 * | 4/2002 | Kimishima | B60H 1/323 180/68.1 |
| 2012/0225341 A1 * | 9/2012 | Major | B60H 1/00278 429/120 |
| 2012/0227431 A1 * | 9/2012 | Wang | B60H 1/00921 62/238.7 |
| 2013/0074525 A1 | 3/2013 | Johnston et al. | |
| 2013/0118707 A1 | 5/2013 | Kardos et al. | |
| 2013/0152611 A1 * | 6/2013 | Furll | B60H 1/00921 62/79 |
| 2014/0033761 A1 | 2/2014 | Kawakami et al. | |
| 2014/0060102 A1 | 3/2014 | Nemesh et al. | |
| 2014/0126689 A1 | 5/2014 | Hara et al. | |
| 2015/0217625 A1 | 8/2015 | Kang et al. | |
| 2015/0217627 A1 * | 8/2015 | Kang | F25B 5/00 62/324.6 |
| 2016/0082805 A1 * | 3/2016 | Graaf | B60H 1/00899 165/202 |
| 2016/0107501 A1 * | 4/2016 | Johnston | B60H 1/00921 165/202 |
| 2016/0107502 A1 * | 4/2016 | Johnston | B60H 1/00921 165/202 |
| 2016/0107503 A1 * | 4/2016 | Johnston | B60H 1/00921 165/202 |
| 2016/0107504 A1 * | 4/2016 | Johnston | B60H 1/00921 165/202 |
| 2016/0107505 A1 * | 4/2016 | Johnston | B60H 1/00385 165/202 |
| 2016/0107506 A1 * | 4/2016 | Johnston | B60H 1/00921 165/202 |
| 2016/0107508 A1 * | 4/2016 | Johnston | B60H 1/00278 165/202 |
| 2016/0318370 A1 * | 11/2016 | Rawlinson | B60H 1/00278 |
| 2017/0008407 A1 * | 1/2017 | Porras | B60H 1/00278 |
| 2017/0021698 A1 * | 1/2017 | Hatakeyama | F25B 7/00 |
| 2017/0158081 A1 * | 6/2017 | Kim | B60L 58/27 |
| 2017/0297408 A1 * | 10/2017 | Kim | B60H 1/00321 |
| 2017/0317393 A1 * | 11/2017 | Blatchley | H01M 10/625 |
| 2019/0225047 A1 * | 7/2019 | Porras | B60H 1/00271 |

FOREIGN PATENT DOCUMENTS

| | | | | |
|---|---|---|---|---|
| DE | 102011016613 A1 * | 11/2011 | ......... | B60H 1/00278 |
| DE | 102014217960 A1 * | 3/2016 | ......... | B60H 1/00899 |
| DE | 102014226346 A1 * | 6/2016 | ......... | B60H 1/00278 |
| DE | 102015016241 A1 * | 6/2017 | ......... | H01M 8/04007 |
| EP | 1 628 093 A2 | 2/2006 | | |
| EP | 2 611 634 A | 3/2012 | | |
| EP | 2636548 B1 * | 9/2017 | ............ | F25B 47/022 |
| EP | 2923866 B1 * | 5/2018 | | |
| FR | 2983285 A1 * | 5/2013 | ......... | B60H 1/00385 |
| JP | 2002-352866 A | 12/2002 | | |
| JP | 2003-148820 A | 5/2003 | | |
| JP | 2006-244928 A | 9/2006 | | |
| JP | 2010-114063 A | 5/2010 | | |
| JP | 5578141 B2 | 8/2014 | | |
| KR | 10-0970336 B1 | 7/2010 | | |
| KR | 10-2011-0138514 A | 12/2011 | | |
| KR | 10-2012-0103054 A | 9/2012 | | |
| KR | 10-2013-0136782 A | 12/2013 | | |
| KR | 10-2014-0147365 A | 12/2014 | | |
| KR | 10-2015-0093590 A | 8/2015 | | |
| KR | 10-2015-0098729 A | 8/2015 | | |
| KR | 10-2016-0046262 A | 4/2016 | | |
| WO | WO 2012/013583 A1 | 2/2012 | | |
| WO | WO 2013/087425 A1 | 6/2013 | | |
| WO | WO-2013124173 A1 * | 8/2013 | ......... | B60H 1/00278 |
| WO | WO-2014030884 A1 * | 2/2014 | ......... | B60H 1/00914 |
| WO | WO-2014040854 A1 * | 3/2014 | ............ | F25B 25/005 |
| WO | WO 2015/010907 A1 | 1/2015 | | |
| WO | WO-2015010907 A1 * | 1/2015 | ......... | B60H 1/00278 |
| WO | WO-2015136768 A1 * | 9/2015 | ............... | F25B 7/00 |
| WO | WO-2016148476 A1 * | 9/2016 | ......... | B60H 1/00907 |
| WO | WO-2017003075 A1 * | 1/2017 | ............... | F25B 5/00 |

\* cited by examiner

FIG. 6

HEAT PUMP SYSTEM FOR VEHICLE

CROSS-REFERENCE TO RELATED APPLICATION

The present application claims priority to and the benefit of Korean Patent Application No. 10-2016-0076562 filed on Jun. 20, 2016, the entire contents of which are incorporated herein by reference.

BACKGROUND OF THE INVENTION

Field of the Invention

The present invention relates to a heat pump system for a vehicle. More particularly, the present invention relates to a heat pump system for a vehicle that warms up or cools a battery module using one chiller in which a heat of a refrigerant and coolant is exchanged and that improves heating efficiency using a waste heat of a motor, an electronic unit, and a battery module.

Description of Related Art

In general, an air-conditioner for a vehicle includes an air-conditioner system that circulates a refrigerant in order to heat or air-condition a vehicle interior.

Such an air-conditioner means enables to maintain a comfortable indoor environment by maintaining a temperature of a vehicle interior regardless of a temperature change of the outside to an appropriate temperature, and in a process in which a refrigerant that is discharged by driving of a compressor again circulates to the compressor via a condenser, a receiver drier, an expansion valve, and an evaporator, the air-conditioner means heats or air-conditions a vehicle interior by heat exchange by the evaporator.

That is, in an air-conditioning mode in summer, an air-conditioner means condenses a vapor refrigerant of a high temperature and a high pressure that is compressed by the compressor through the condenser and lowers an indoor temperature and humidity through evaporation in the evaporator via the receiver drier and the expansion valve.

Nowadays, while interest in energy efficiency and an environment pollution problem increases, development of an environmentally-friendly vehicle that can substantially replace an internal combustion engine vehicle is requested, and such an environmentally-friendly vehicle is classified into an electric vehicle that is driven using a fuel cell or electricity as a power source and a hybrid vehicle that is driven using an engine and a battery.

In an electric vehicle or a hybrid vehicle of such an environmentally-friendly vehicle, unlike an air-conditioner of a general vehicle, an air-conditioner in which a separate heater is not used and that is applied to the environmentally-friendly vehicle is referred to as a heat pump system.

The electric vehicle converts chemical reaction energy of oxygen and hydrogen to electrical energy to generate a driving torque, and in this process, thermal energy occurs by a chemical reaction within a fuel cell and it is essential in securing a performance of the fuel cell to effectively remove a generated heat.

The hybrid vehicle generates a driving torque by driving a motor using electricity that is supplied from an electric battery or the fuel cell together with an engine operating with general fuel, and when effectively removing a heat occurring in a fuel cell, a battery, and a motor, a performance of the motor may be secured.

Accordingly, in a conventional hybrid vehicle or electric vehicle, in order to prevent heat emission of a motor, an electronic unit, and a battery including a fuel cell, a battery cooling system together with an electric unit cooling means and a heat pump system each should be configured with a separate close and seal circuit.

Therefore, there is a defect that a size and weight of a cooling module that is disposed at the front side of the vehicle increase and that a layout of connection pipes that supply a refrigerant or coolant from the inside of an engine compartment to respective heat pump system, electric unit cooling means, and battery cooling system becomes complex.

Further, in order to enable the battery to exhibit an optimal performance, a battery cooling system for warming up or cooling the battery according to a vehicle state is separately provided, and a plurality of valves for connecting with each connection pipe are applied, and noise and vibration due to a frequently opening and closing operation of the valves are transferred to the vehicle interior and thus that is a defect that ride comfort is deteriorated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a heat pump system for a vehicle having advantages of being capable of simplifying the system by warming up or cooling a battery module using one chiller in which a heat of a refrigerant and coolant is exchanged.

The present invention has been made in an effort to further provide a heat pump system for a vehicle having advantages of being capable of improving heating efficiency using a waste heat of a motor, an electronic unit, and a battery module.

An exemplary embodiment of the present invention provides a heat pump system for a vehicle including: a battery cooling line that is connected with a battery module and in which coolant moves; a chiller that is connected with the battery cooling line through a first connection line in order to adjust a temperature of coolant by selectively exchanging a heat of a refrigerant and coolant that are injected therein and that is connected with a refrigerant line of an air-conditioner means through a second connection line; an electric unit cooling means including a radiator and a first water pump that are connected through a cooling line in order to circulate coolant for cooling a motor and an electronic unit and that is selectively connectable with the battery cooling line and the first connection line through a first valve; and a bypass line that selectively connects the second connection line and the refrigerant line through a second valve that is provided in the refrigerant line.

The air-conditioner means may include: a Heating, Ventilation, and Air Conditioning (HVAC) module that is connected through the refrigerant line and that has therein an opening and closing door that adjusts to selectively inject external air that passes through an evaporator into an internal condenser according to an air-conditioning, heating, and heating/dehumidification modes of the vehicle; a compressor that is connected through the refrigerant line between the evaporator and the internal condenser; an accumulator that is provided in the refrigerant line between the compressor and the evaporator; an external condenser that is connected with the internal condenser through the refrigerant line and that is disposed at the front side of the vehicle; a first expansion valve that is provided at the refrigerant line that connects the external condenser and the evaporator; a dehumidification line having one end that is connected with the refrigerant line between the internal condenser and the external condenser and having the other end that is connected with the refrigerant line between the evaporator and the first expansion valve and having a third valve; a defrosting line that is connected with the refrigerant line between the external condenser and the first expansion valve through a fourth valve that is provided at the refrigerant line between the internal condenser and the external condenser; and a second expansion valve that is provided at the second connection line.

The battery cooling line may include: a fifth valve that connects the battery cooling line and the cooling line that connects the motor and the electronic unit between the radiator and the chiller; and a sixth valve that connects the battery cooling line and the cooling line that connect the motor and the electronic unit between the battery module and the radiator.

The bypass line, the dehumidification line, and the defrosting line may be closed through operation of the second, third, and fourth valves, and the chiller may be coupled in parallel to the evaporator and the external condenser, when cooling the battery module in an air-conditioning mode of a vehicle.

The bypass line, the dehumidification line, and the defrosting line may be closed through operation of the second, third, and fourth valves, and operation of the first expansion valve may be stopped, and the second expansion valve may be operated, upon cooling the battery module using a refrigerant when an air-conditioning mode of a vehicle is not operated.

The first and second connection lines and the bypass line may be opened through operation of the first valve and the second valve, and the dehumidification line and the defrosting line may be closed and operation of the first and second expansion valves may be stopped through operation of the third valve and the fourth valve, when recovering a waste heat of the battery module, the motor, and the electronic unit in a heating mode of the vehicle.

The cooling line that connects the motor and the electronic unit may be selectively connectable with the first connection line through operation of the first, fifth, and sixth valves.

The first connection line and the bypass line may be opened through operation of the first and second valves, the cooling line and the battery cooling line that connect the motor and the electronic unit may be connected with the first connection line through operation of the first, fifth, and sixth valves, the dehumidification line may be opened through operation of the third valve, and the defrosting line may be closed and operation of the first and second expansion valves may be stopped through operation of the fourth valve, when recovering a waste heat of the motor and the electronic unit in a heating and dehumidification mode of a vehicle.

The first connection line, the bypass line, and the defrosting line may be opened through operation of the first, second, and third valves, the refrigerant line and the dehumidification line that are connected with the external condenser may be closed through operation of the third and fourth valves, and the battery cooling line and the cooling line that connects the motor and the electronic unit may be connected with the first connection line and operation of the first and second expansion valves may be stopped through operation of the first, fifth, and sixth valves, when recovering a waste heat of the battery module, the motor, and the electronic unit in a heating and defrosting mode of a vehicle.

In the cooling line, a reservoir tank may be provided between the radiator and the fifth valve.

The first, second, fourth, fifth, and sixth valves may be a 3-way valve that can distribute a flow rate.

The second expansion valve may operate when cooling the battery module using an air-conditioning mode of a vehicle or a refrigerant, expand a refrigerant that is injected through the second connection line, and inject the refrigerant into the chiller.

An orifice may be provided in the refrigerant line between the internal condenser and the fourth valve.

The orifice may selectively open and close the refrigerant line or may selectively expand a refrigerant passing through the refrigerant line.

The dehumidification line may be connected with the refrigerant line between the fourth valve and the orifice.

The dehumidification line may be opened through operation of the third valve in a heating and dehumidification mode of a vehicle.

A second water pump may be provided in the battery cooling line between the chiller and the battery module.

The electronic unit may include an Electric Power Control Unit (EPCU) that is provided on the cooling line between the motor and the first water pump and an On Board Charger (OBC) that is provided on the cooling line between the motor and the radiator.

A seventh valve may be provided in the first connection line between the first valve and the chiller, and a heater may be provided in the battery cooling line between the battery module and the chiller.

The heater may be turned on upon warming up the battery module to heat coolant circulating in the battery cooling line and to inject the coolant into the battery module.

The heater may be selectively turned on in a heating mode of a vehicle or a heating and defrosting mode of a vehicle to heat coolant circulating in the battery cooling line.

As described above, in a heat pump system for a vehicle according to an exemplary embodiment of the present invention, in an electric vehicle or a hybrid vehicle, by warming up or cooling a battery module according to a vehicle mode using one chiller in which a heat of a refrigerant and coolant is exchanged, the system can be simplified.

Further, as the battery module is efficiently warmed up and cooled to correspond to a vehicle mode, an optimal performance of the battery module can be exhibited, and an entire travel distance of the vehicle can increase through efficient management of the battery module.

Further, by selectively using a waste heat of a motor, an electronic unit, and a battery module, heating efficiency can be improved.

Further, through simplification of an entire system, a production cost can be reduced and a weight can be reduced, and space use can be improved.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several FIGS. of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

An embodiment described in this specification and a configuration shown in the drawing is merely an exemplary embodiment of the present invention and do not entirely represent the scope and spirit of the present invention and thus it should be understood that various equivalents and exemplary variations that can replace the exemplary embodiment may exist at an application time point of the present invention.

The drawings and description are to be regarded as illustrative in nature and not restrictive. Like reference numerals designate like elements throughout the specification.

Further, in the drawings, a size and thickness of each element are randomly represented for better understanding and ease of description and the present invention is not limited thereto and the thickness of several portions and areas are exaggerated for clarity.

In addition, in the entire specification, unless explicitly described to the contrary, the word "comprise" and variations such as "comprises" or "comprising" will be understood to imply the inclusion of elements but not the exclusion of any other stated elements.

In addition, the terms " . . . unit", " . . . means", " . . . unit", and " . . . member" described in the specification mean units for processing at least one function and operation.

Figure 1:
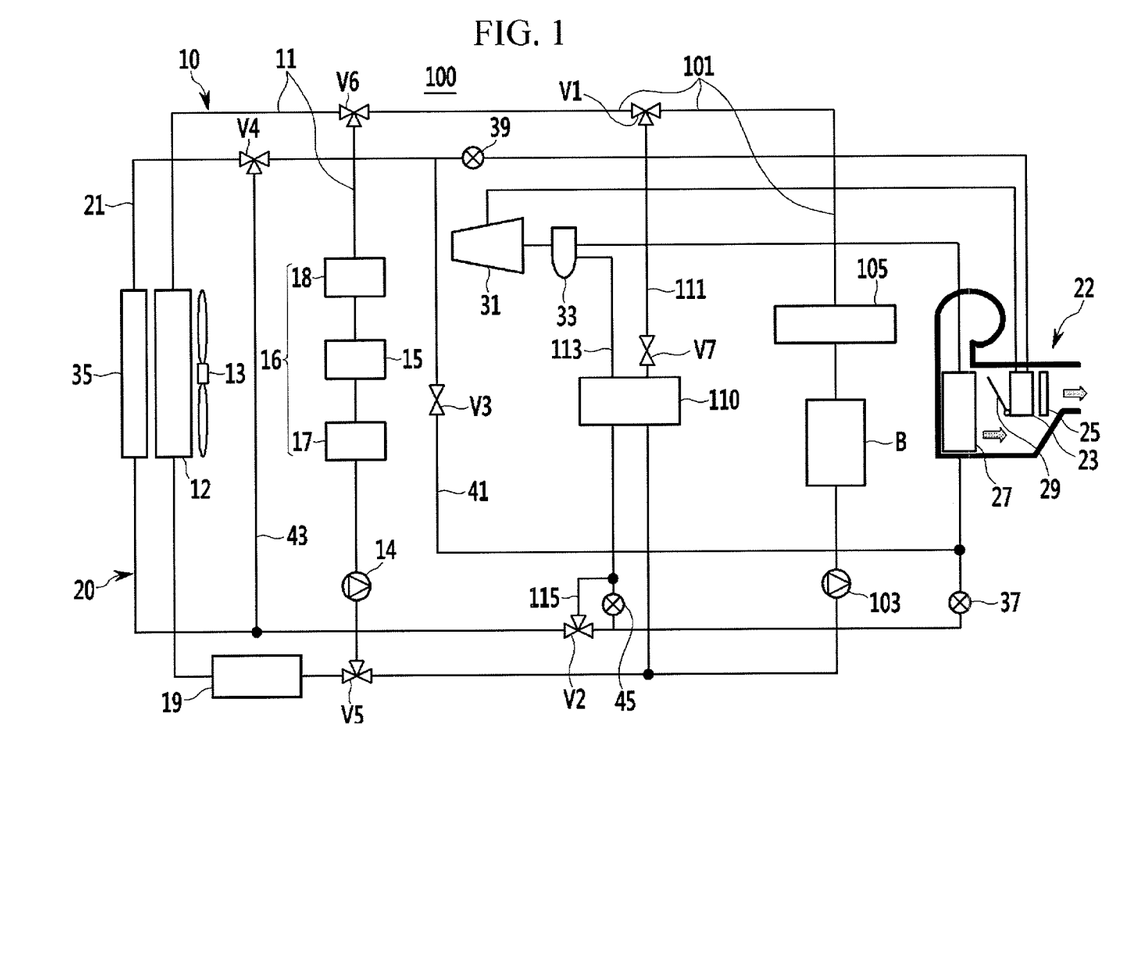
FIG. 1 is a block diagram illustrating a configuration of a heat pump system for a vehicle according to an exemplary embodiment of the present invention.

FIG. 1 is a block diagram illustrating a configuration of a heat pump system for a vehicle according to an exemplary embodiment of the present invention.

A heat pump system 100 for a vehicle according to an exemplary embodiment of the present invention warms up or cools a battery module B that is mounted in the vehicle or selectively uses a waste heat that is generated in a battery module B or a motor 15 and an electronic unit 16, thereby improving heating efficiency.

As shown in FIG. 1, such a heat pump system 100 is interlocked with an air-conditioner means 20, which is an air conditioner for air-conditioning or heating a vehicle interior and an electric unit cooling means 10 for cooling the motor 15 and the electronic unit 16 in a hybrid vehicle or an electric vehicle.

Here, the electric unit cooling means 10 includes a radiator 12 and a first water pump 14 that connected with a cooling line 11 and circulates coolant in order to cool the motor 15 and the electronic unit 16.

The electronic unit 16 may include an Electric Power Control Unit (EPCU) 17 that is provided on the cooling line 11 between the motor 15 and the first water pump 14 and an On Board Charger (OBC) 18 that is provided on the cooling line 11 between the motor 15 and the radiator 12.

The radiator 12 is disposed at the front side of the vehicle, and at the rear side thereof, a cooling fan 13 is provided to cool coolant through operation of the cooling fan 13 and heat exchange with external air.

The electric unit cooling means 10 having the foregoing configuration circulates coolant that is cooled in the radiator 12 through operation of the first water pump 14 along the cooling line 11, thereby cooling the motor 15 and the electronic unit 16 to prevent from being overheated.

The air-conditioner means 20 includes a Heating, Ventilation, and Air Conditioning (HVAC) module 22, a compressor 31, an accumulator 33, an external condenser 35, and a first expansion valve 37 that are connected through a refrigerant line 21.

First, the HVAC module 22 is connected through the refrigerant line 21 and has therein an opening and closing door 29 that adjusts to selectively inject external air, having passed through an evaporator 27 into an internal condenser 23 and a internal heater 25 according to an air-conditioning, heating, and heating/dehumidification mode of the vehicle.

That is, the opening and closing door 29 is opened to inject external air, having passed through the evaporator 27 into the internal condenser 23 and the internal heater 25 in a heating mode of the vehicle. In contrast, in an air-conditioning mode of the vehicle, in order to immediately inject external air that is cooled while passing through the evaporator 27 into the vehicle, the opening and closing door 29 closes the internal condenser 23 and internal heater 25 side.

The compressor 31 is connected through the refrigerant line 21 between the evaporator 27 and the internal condenser 23. Such a compressor 31 compresses a vapor phase refrigerant.

The accumulator 33 is provided in the refrigerant line 21 between the compressor 31 and the evaporator 27. Such an accumulator 33 supplies only a vapor phase refrigerant to the compressor 31, thereby improving efficiency and durability of the compressor 31.

In the present exemplary embodiment, the external condenser 35 is connected with the internal condenser 23 through the refrigerant line 21. Such an external condenser 35 is disposed at the front side of the electric field radiator 12 to exchange a heat of a refrigerant that is injected therein with a heat of external air.

The first expansion valve 37 is provided in the refrigerant line 21 that connects the external condenser 35 and the evaporator 27. The first expansion valve 37 receives and expands the refrigerant, having passed through the external condenser 35.

Here, the heat pump system 100 according to the present exemplary embodiment includes a battery cooling line 101, a chiller 110, and a bypass line 115.

First, the battery cooling line 101 is connected with the battery module B, and coolant is moved. The battery module B supplies power to the motor 15 and the electronic unit 16. Such a battery module B may be formed in a water cooling type that cools through coolant.

Here, in the battery cooling line 101, a second water pump 103 may be provided between the chiller 110 and the battery module B. The second water pump 103 operates to circulate coolant through the battery cooling line 101.

The first water pump 14 and the second water pump 103 may be an electric motion type water pump.

The chiller 110 is connected with the battery cooling line 101 through a first connection line 111 and is connected with the refrigerant line 21 through a second connection line 113. Such a chiller 110 adjusts a temperature of coolant through selective heat exchange of a refrigerant and coolant that are injected therein.

Here, the air-conditioner means 20 is selectively connectable with the battery cooling line 101 and the first connection line 111 through a first valve V1.

The first valve V1 selectively communicates the cooling line 11 and the battery cooling line 101 or controls a movement flow of coolant moving through the cooling line 11 and the battery cooling line 101.

In the present exemplary embodiment, the bypass line 115 selectively connects the second connection line 113 and the refrigerant line 21 through a second valve V2 that is provided in the refrigerant line 21.

In the present exemplary embodiment, the air-conditioner means 20 further includes a dehumidification line 41, a defrosting line 43, and a second expansion valve 45.

First, one end of the dehumidification line 41 is connected with the refrigerant line 21 between the internal condenser 23 and the external condenser 35. The other end of the dehumidification line 41 is connected with the refrigerant line 21 between the evaporator 27 and the first expansion valve 37. In such a dehumidification line 41, a third valve V3 is provided.

That is, in a heating and dehumidification mode of the vehicle, the dehumidification line 41 may be opened through operation of the third valve V3.

The defrosting line 43 is connected with the refrigerant line 21 between the external condenser 35 and the first expansion valve 37 through a fourth valve V4 that is provided in the refrigerant line 21 between the internal condenser 23 and the external condenser 35.

Here, an orifice 39 may be provided in the refrigerant line 21 between the internal condenser 23 and the fourth valve V4.

The orifice 39 performs a function of expanding a refrigerant that is discharged from the internal condenser 23.

Further, the orifice 39 may perform a function of a valve that selectively circulates a refrigerant without expansion according to an air-conditioning, heating and heating/dehumidification mode.

That is, the orifice 39 may selectively open and close the refrigerant line 21 or may selectively expand a refrigerant that passes through the refrigerant line 21.

Here, the dehumidification line 41 may be connected with the refrigerant line 21 between the fourth valve V3 and the orifice 39.

Such a dehumidification line 41 may be selectively opened through operation of the third valve V3 in a heating and dehumidification mode of the vehicle.

The second expansion valve 45 is provided in the second connection line 113 between the condenser 35 and the chiller 110.

When operating a vehicle in an air-conditioning mode or when cooling the battery module B with a refrigerant, the second expansion valve 45 is operated. Such a second expansion valve 45 expands a refrigerant that is injected through the second connection line 113 to inject the refrigerant into the chiller 110 in a low temperature state.

That is, the second expansion valve 45 expands a condensed refrigerant that is discharged from the condenser 35 and injects the refrigerant of a state in which a temperature is lowered into the chiller 110, thereby further lowering a water temperature of coolant passing through-the inside of the chiller 110.

Accordingly, coolant whose water temperature is lowered while passing through the chiller 110 is injected into the battery module B, thereby more efficiently cooling the battery module B.

Further, in the battery cooling line 101, a fifth valve V5 and a sixth valve V6 are further provided.

The fifth valve V5 connects the battery cooling line 101 and the cooling line 11 that connects the motor 15 and the electronic unit 16 between the radiator 12 and the chiller 110.

The sixth valve V6 connects the battery cooling line 101 and the cooling line 11 that connects the motor 15 and the electronic unit 16 between the battery module B and the radiator 12.

That is, the cooling line 11 that connects the motor 15 and the electronic unit 16 may be selectively connectable with the first connection line 111 through operation of the first, fifth, and sixth valves V1, V5, and V6.

Further, in the cooling line 11 between the radiator 12 and the fifth valve V5, a reservoir tank 19 may be provided.

The reservoir tank 19 may store coolant that is injected from the radiator 12 and in which cooling is complete.

In the present exemplary embodiment, the first water pump 14 is provided on the cooling line 11 between the fifth valve V5 and the power control apparatus 17, but the present invention is not limited thereto and the first water pump 14 may be provided on the cooling line 11 between the fifth valve V5 and the reservoir tank 19.

When the first water pump 14 is provided between the reservoir tank 19 and the fifth valve V5, upon cooling the battery module B with coolant, while being operated together with the second water pump 103, the first water pump 14 can increase a flow rate of coolant that circulates to the battery module B.

In the present exemplary embodiment, the first, second, fourth, fifth, and sixth valves V1, V2, V4, V5, and V6 may be a 3-Way valve that can distribute a flow rate.

In the first connection line 111 between the first valve V1 and the chiller 110, a seventh valve V7 may be provided.

The seventh valve V7 performs a function of preventing coolant from flowing backward from the chiller 110 toward the first valve V1.

Further, in the battery cooling line 101 between the battery module B and the chiller 110, a heater 105 may be provided.

Here, the heater 105 is selectively turned on upon warming up the battery module B to heat coolant that circulates in the battery cooling line 101, thereby injecting the coolant into the battery module B.

Further, the heater 105 is selectively turned on in a heating mode or a heating and defrosting mode of the vehicle to heat coolant circulating in the battery cooling line 101.

Hereinafter, operation on each mode basis of a heat pump system 100 for a vehicle according to an exemplary embodiment of the present invention having the forgoing configuration will be described in detail with reference to FIGS. 2 to 6.

First, operation when a heat pump system 100 for a vehicle according to an exemplary embodiment of the present invention cools a battery module according to an air-conditioning mode of a vehicle will be described with reference to FIG. 2.

Figure 2:
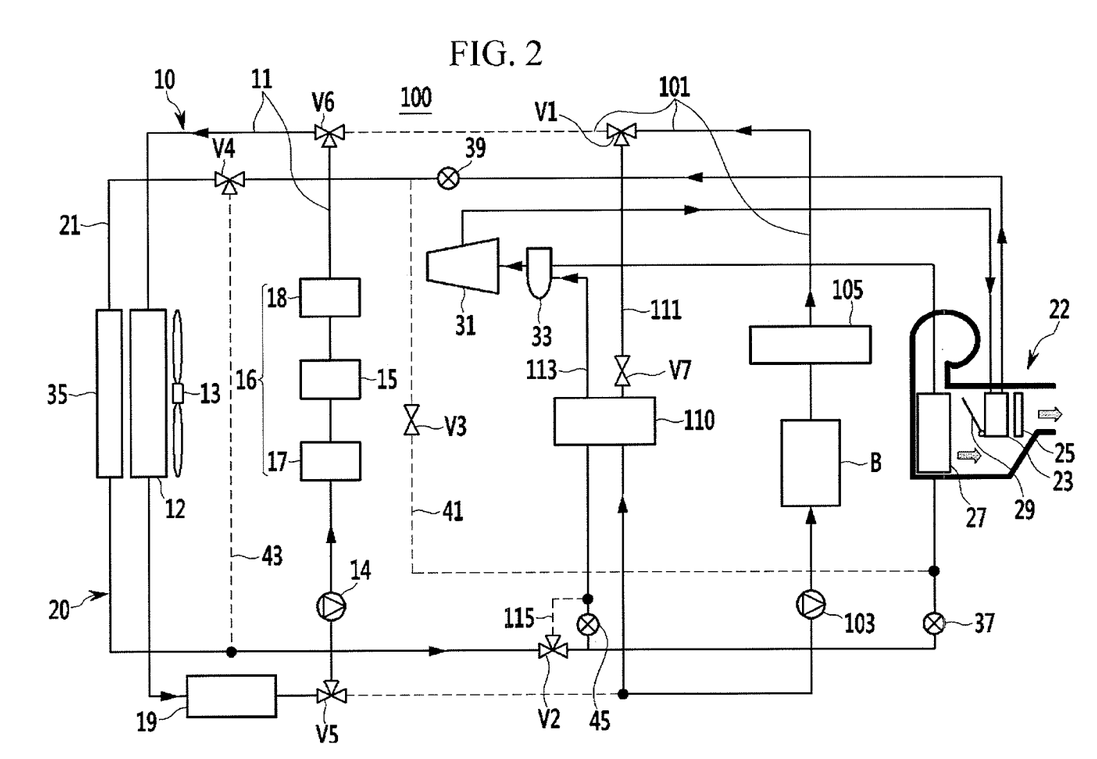
FIG. 2 is a block diagram illustrating an operation state upon cooling a battery module according to an air-conditioning mode of a vehicle in a heat pump system for the vehicle according to an exemplary embodiment of the present invention.

FIG. 2 is a block diagram illustrating an operation state upon cooling a battery module according to an air-conditioning mode of a vehicle in a heat pump system for the vehicle according to an exemplary embodiment of the present invention.

Referring to FIG. 2, in an air-conditioning mode of a vehicle, when cooling the battery module B, in the electric unit cooling means 10, the cooling line 11 is opened through operation of the fifth and sixth valves V5 and V6 according to a cooling request and a coolant temperature of the motor 15 and the electronic unit 16.

Simultaneously, the first connection line 111 is opened to connect the battery module B and the chiller 110 through operation of the first valve V1.

Here, the cooling line 11 and the battery cooling line 101 are not connected through operation of the fifth and sixth valves V5 and V6.

Accordingly, in the electric unit cooling means 10 and the battery module B, coolant is moved to respective closed circuits.

That is, in order to cool the motor 15 and the electronic unit 16 through operation of the first water pump 14, coolant that is cooled in the radiator 12 circulates the cooling line 21.

In order to cool the battery module B through operation of the second water pump 103, the coolant, having passed through the chiller 110 circulates the battery cooling line 101.

The coolant that circulates the battery cooling line 101 is cooled through heat exchange with a refrigerant in the chiller 110 and is supplied to the battery module B. Accordingly, the battery module B is cooled by the cooled coolant.

In order to air-condition a vehicle interior, the air-conditioner means 20 circulates a refrigerant along the refrigerant line 21 to air-condition the interior.

Here, the bypass line 115, the dehumidification line 41, and the defrosting line 43 are closed through operation of the second, third, and fourth valves V2, V3, and V4.

Accordingly, the chiller 110 may be coupled in parallel to the evaporator 27 and the external condenser 35.

Some refrigerants that are discharged from the external condenser 35 are expanded through operation of the second expansion valve 45 to be a low temperature and low pressure state and are injected into the chiller 110 that is connected with the second connection line 113.

Thereafter, the refrigerant that is injected into the chiller 110 exchanges a heat with coolant and is injected into the accumulator 33 through the second connection line 113.

That is, coolant whose temperature is increased while cooling the battery module B is cooled through heat exchange with a refrigerant of a low temperature and low pressure within the chiller 110. The cooled coolant is supplied again to the battery module B through the battery cooling line 101.

That is, while repeating the foregoing operation, coolant can efficiently cool the battery B.

In order to air-condition a vehicle interior, the remaining refrigerants that are discharged from the external condenser 35 are moved through the refrigerant line 21 and sequentially pass through the first expansion valve 37, the evaporator 27, the accumulator 33, the compressor 31, and the internal condenser 23.

Here, external air that is injected into the HVAC module 22 is cooled while passing through the evaporator 27 by the refrigerant of a low temperature state that is injected into the evaporator 27.

In this case, the opening and closing door 29 closes a portion that communicates with the internal condenser 23 such that cooled external air does not pass through the internal condenser 23 and the internal heater 25. Therefore, the cooled external air is directly injected into the vehicle, thereby air-conditioning a vehicle interior.

Thereafter, the refrigerant passes through the orifice 39, is injected into the external condenser 35, and is condensed through heat exchange with external air while passing through the external condenser 35.

In this case, the orifice 39 may operate as a valve.

That is, while repeating the foregoing process, the refrigerant air-conditions the interior in an air-conditioning mode of a vehicle and simultaneously cools coolant through heat exchange while passing through the chiller 110.

In the present exemplary embodiment, in a state in which an air-conditioning mode of a vehicle is stopped, operation when cooling the battery module using a refrigerant will be described with reference to FIG. 3.

Figure 3:
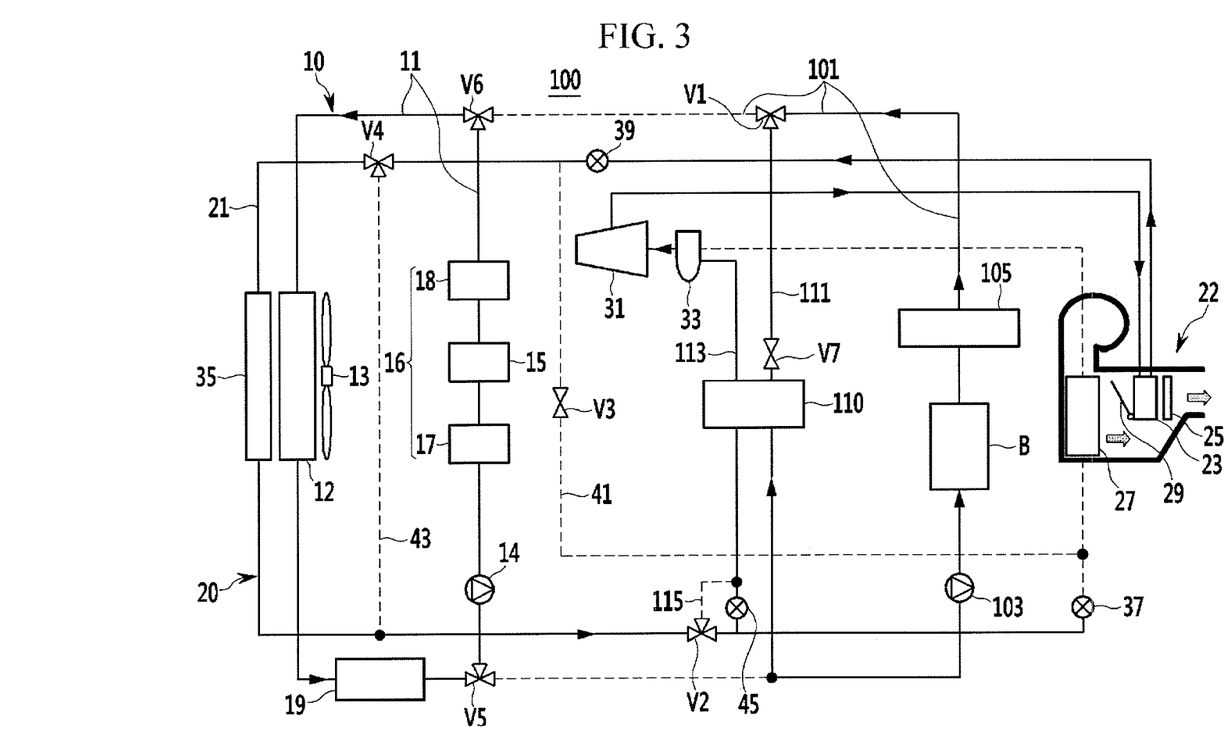
FIG. 3 is a block diagram illustrating an operation state upon cooling a battery module using a refrigerant in a state in which an air-conditioning mode of a vehicle is stopped in a heat pump system for a vehicle according to an exemplary embodiment of the present invention.

FIG. 3 is a block diagram illustrating an operation state upon cooling a battery module using a refrigerant in a state in which an air-conditioning mode of a vehicle is stopped in a heat pump system for a vehicle according to an exemplary embodiment of the present invention.

Referring to FIG. 3, when cooling a battery module B using a refrigerant, operation of the first expansion valve 37 of the air-conditioner means 20 is stopped to prevent the refrigerant from being injected into the evaporator 27.

Accordingly, the refrigerant is injected from the compressor 31 into the external condenser 35 to be condensed through heat exchange with external air. Thereafter, the refrigerant is discharged from the external condenser 35 to be injected into the second connection line 113 along the refrigerant line 21.

The refrigerant that is injected into the second connection line 113 is expanded through operation of the second expansion valve 45 to become a low temperature and low pressure state and to be injected into the chiller 110.

The refrigerant that is injected into the chiller 110 exchanges a heat with coolant and is injected into the accumulator 33 through the second connection line 113.

That is, coolant whose temperature is increased while cooling the battery module B is cooled through heat exchange with a refrigerant of a low temperature and a low pressure within the chiller 110. The cooled coolant is supplied again to the battery module B through the battery cooling line 101.

Therefore, while repeating the foregoing operation, coolant may efficiently cool the battery B.

The refrigerant, having passed through the chiller 110 passes through the accumulator 33 and again sequentially passes through the compressor 31 and the internal condenser 23.

Thereafter, the refrigerant passes through the orifice 39, is injected into the external condenser 35, and is condensed through heat exchange with external air while passing through the external condenser 35.

In this case, the orifice 39 may operate as a valve.

Here, the bypass line 115, the dehumidification line 41, and the defrosting line 43 are closed through operation of the second, third, and fourth valves V2, V3, and V4.

In the electric unit cooling means 10, the cooling line 11 is opened through operation of the fifth and sixth valves V5 and V6 according to a cooling request and a coolant temperature of the motor 15 and the electronic unit 16.

Simultaneously, the first connection line 111 is opened to connect the battery module B and the chiller 110 through operation of the first valve V1.

Here, the cooling line 11 and the battery cooling line 101 are not connected through operation of the fifth and sixth valves V5 and V6.

Accordingly, in the electric unit cooling means 10 and the battery module B, coolant independently moves through respective closed circuits.

That is, in order to cool the motor 15 and the electronic unit 16 through operation of the first water pump 14, coolant that is cooled in the radiator 12 circulates the cooling line 11.

However, coolant that circulates the battery cooling line 101 is cooled through heat exchange with the refrigerant in the chiller 110 and is supplied to the battery module B. Accordingly, the battery module B is cooled by coolant that is cooled through heat exchange with the refrigerant.

That is, in the battery module B, coolant that is cooled through heat exchange with a refrigerant in the chiller 110 is injected through operation of the second water pump 103. Accordingly, the cooled coolant can efficiently cool the battery module B.

In FIGS. 2 and 3, the electric unit cooling means 10 operates, but the present invention is not limited thereto and when cooling of the motor 15 and the electronic unit 16 is not required, circulation of coolant to the cooling line 11 may be stopped.

In the present exemplary embodiment, operation when recovering a waste heat in the electronic unit and the battery module according to a heating mode of a vehicle will be described with reference to FIG. 4.

Figure 4:
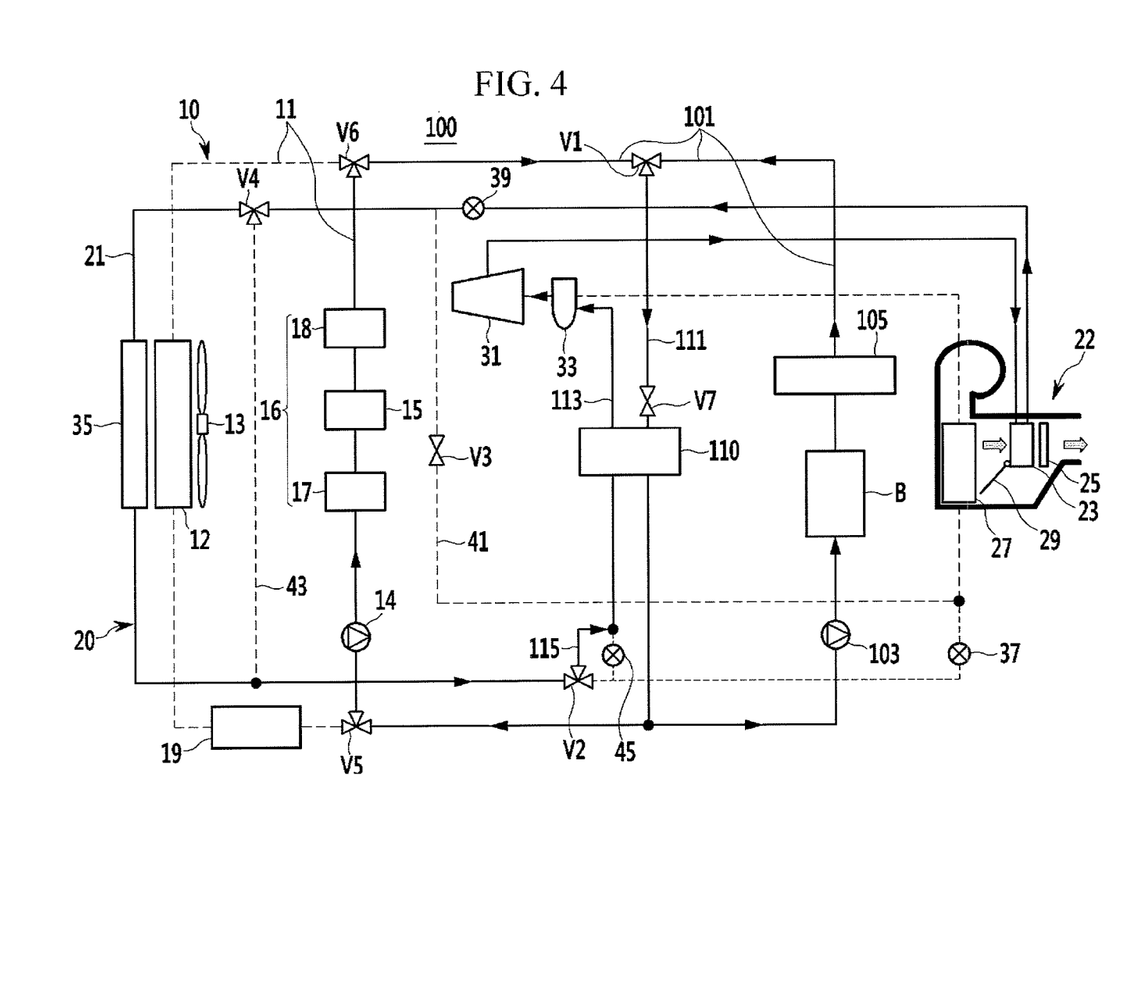
FIG. 4 is a block diagram illustrating an operation state upon recovering a waste heat in an electronic unit and a battery module according to a heating mode of a vehicle in a heat pump system for the vehicle according to an exemplary embodiment of the present invention.

FIG. 4 is a block diagram illustrating an operation state upon recovering a waste heat in an electronic unit and a battery module according to a heating mode of a vehicle in a heat pump system for the vehicle according to an exemplary embodiment of the present invention.

Referring to FIG. 4, when recovering a waste heat of the battery module B, the motor 15, and the electronic unit 16 in a heating mode of the vehicle, the first and second connection lines 111 and 113 and the bypass line 115 are opened through operation of the first and second valves V1 and V2.

The dehumidification line 41 and the defrosting line 43 are closed through operation of the third and fourth valves V3 and V4.

In this case, the fifth and sixth valves V5 and V6 close connection of the cooling line 11 such that the motor 15 and the electronic unit 16 are not connected with the radiator 12.

Simultaneously, the fifth and sixth valves V5 and V6 communicate the cooling line 11 passing through the motor 15 and the electronic unit 16 with the battery cooling line 101.

Accordingly, coolant whose temperature is increased due to a waste heat that is generated in the motor 15 and the electronic unit 16 and a waste heat that is generated in the battery module B is injected into the first connection line 111 through operation of the first and second water pumps 14 and 103 to pass through the chiller 110.

Here, operation of the first and second expansion valves 37 and 45 is stopped.

Therefore, the refrigerant that is discharged from the external condenser 35 is injected into the bypass line 115 that is opened through operation of the second valve V2. Thereafter, the refrigerant is injected into the chiller 110 through the second connection line 113 and exchanges a heat with coolant whose temperature is increased in the chiller 110.

That is, a waste heat that is generated in the motor 15, the electronic unit 16, and the battery module B increases a temperature of the refrigerant in the chiller 110.

The refrigerant whose temperature is increased is injected into the compressor 31 by passing through the accumulator 33 and is compressed to a state of a high temperature and a high pressure from the compressor 31 to be injected into the internal condenser 23.

Here, the opening and closing door 29 is opened such that external air that is injected into the HVAC module 22 and that passes through the evaporator 27 passes through the internal condenser 23.

Accordingly, when external air that is injected from the outside passes through the evaporator 27 in which a refrigerant is not supplied, the external air is injected to a room temperature state that is not cooled. The injected external air is converted to a high temperature state while passing through the internal condenser 23, passes through the selectively operating internal heater 25, and is injected into a vehicle interior, thereby heating the vehicle interior.

Thereafter, the refrigerant is injected into the external condenser 35 in an expanded state while passing through the orifice 39 and is condensed through heat exchange with external air while passing through the external condenser 35.

In this case, the orifice 39 may operate as an expansion valve.

The heater 105 is selectively operated, as needed to heat coolant that is circulated in the battery cooling line 101. Accordingly, a temperature of a refrigerant passing through the chiller 110 quickly increases.

That is, the heat pump system 100 according to the present exemplary embodiment uses a waste heat that is generated in the motor 15, the electronic unit 16, and the battery module B in a heating mode of the vehicle for increasing a refrigerant temperature, thereby reducing power consumption of the compressor 31 and improving heating efficiency.

In the present exemplary embodiment, operation upon recovering a waste heat in the electronic unit and the battery module according to a heating and dehumidification mode of the vehicle will be described with reference to FIG. 5.

Figure 5:
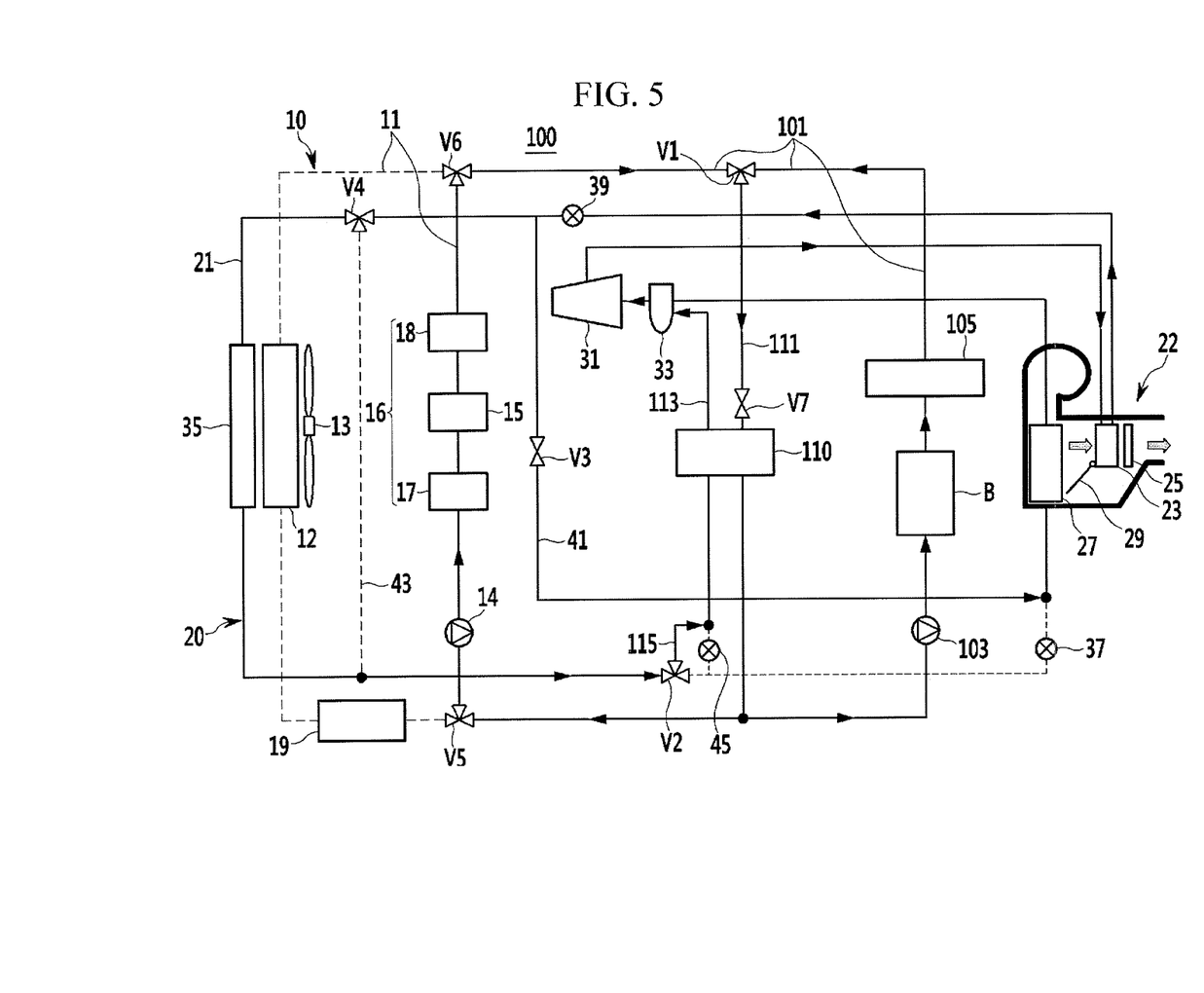
FIG. 5 is a block diagram illustrating an operation state upon recovering a waste heat in an electronic unit and a battery module according to heating and dehumidification modes of a vehicle in a heat pump system for the vehicle according to an exemplary embodiment of the present invention.

FIG. 5 is a block diagram illustrating an operation state upon recovering a waste heat in an electronic unit and a battery module according to heating and dehumidification modes of a vehicle in a heat pump system for the vehicle according to an exemplary embodiment of the present invention.

Referring to FIG. 5, in a heating and dehumidification mode of the vehicle, when recovering a waste heat of the battery module B, the motor 15, and the electronic unit 16, the first and second connection lines 111 and 113 and the bypass line 115 are opened through operation of the first and second valves V1 and V2.

The fifth and sixth valves V5 and V6 close connection of the cooling line 11 such that the motor 15 and the electronic unit 16 are not connected with the radiator 12.

Simultaneously, the battery cooling line 101 and the cooling line 11 passing through the motor 15 and the electronic unit 16 are connected with the first connection line 111 through operation of the first, fifth, and sixth valves V1, V5, and V6.

Accordingly, coolant whose temperature is increased due to a waste heat that is generated in the motor 15 and the electronic unit 16 and a waste heat that is generated in the battery module B is injected into the first connection line 111 through operation of the first and second water pumps 14 and 103 to pass through the chiller 110.

Here, the dehumidification line 41 is opened through operation of the third valve V3 such that a portion of the refrigerant that is injected into the external condenser 35 circulates.

The defrosting line 43 is closed through operation of the fourth valve V4, and operation of the first and second expansion valves 37 and 45 is stopped.

Therefore, a refrigerant that is discharged from the external condenser 35 is injected into the bypass line 115 that is opened through operation of the second valve V2. Thereafter, the refrigerant is injected into the chiller 110 through the second connection line 113 and exchanges a heat with coolant whose temperature is increased in the chiller 110.

That is, a waste heat that is generated in the motor 15, the electronic unit 16, and the battery module B increases a temperature of the refrigerant in the chiller 110.

The refrigerant whose temperature is increased passes through the accumulator 33, is injected into the compressor 31, and is compressed to a state of a high temperature and a high pressure by the compressor 31 to be injected into the internal condenser 23.

The refrigerant line 21 that connects the first expansion valve 37 and the evaporator 27 is closed through operation of the second valve V2. However, a portion of the refrigerant that is expanded while passing through the orifice 39 is injected into the evaporator 27 through the opened dehumidification line 41.

In such a state, the opening and closing door 29 is opened such that external air that is injected into the HVAC module 22 and that passes through the evaporator 27 passes through the internal condenser 23.

That is, external air that is injected into the HVAC module 22 is dehumidified while passing through the evaporator 27 by a refrigerant of a low temperature state that is injected into the evaporator 27. Thereafter, external air is converted to a high temperature state while passing through the internal condenser 23 and is injected into a vehicle interior by passing through the selectively operating internal heater 25, thereby heating/dehumidifying the vehicle interior.

Thereafter, the refrigerant is injected into the external condenser 35 in an expanded state while passing through the orifice 39 and is condensed through heat exchange with external air while passing through the external condenser 35.

In this case, the orifice 39 may operate as an expansion valve.

That is, the heat pump system 100 according to the present exemplary embodiment uses a waste heat that is generated in the motor 15, the electronic unit 16, and the battery module B in a heating and dehumidification mode of the vehicle for increasing a temperature of the refrigerant, thereby reducing power consumption of the compressor 31 and improving heating efficiency.

Further, by injecting a portion of the refrigerant that is expanded while passing through the orifice 39 into the evaporator 27 through the dehumidification line 41, indoor dehumidification can be performed without operation of the first expansion valve 37.

In the present exemplary embodiment, operation upon recovering a waste heat in the electronic unit and the battery module according to a heating and defrosting mode of the vehicle will be described with reference to FIG. 6.

Figure 6:
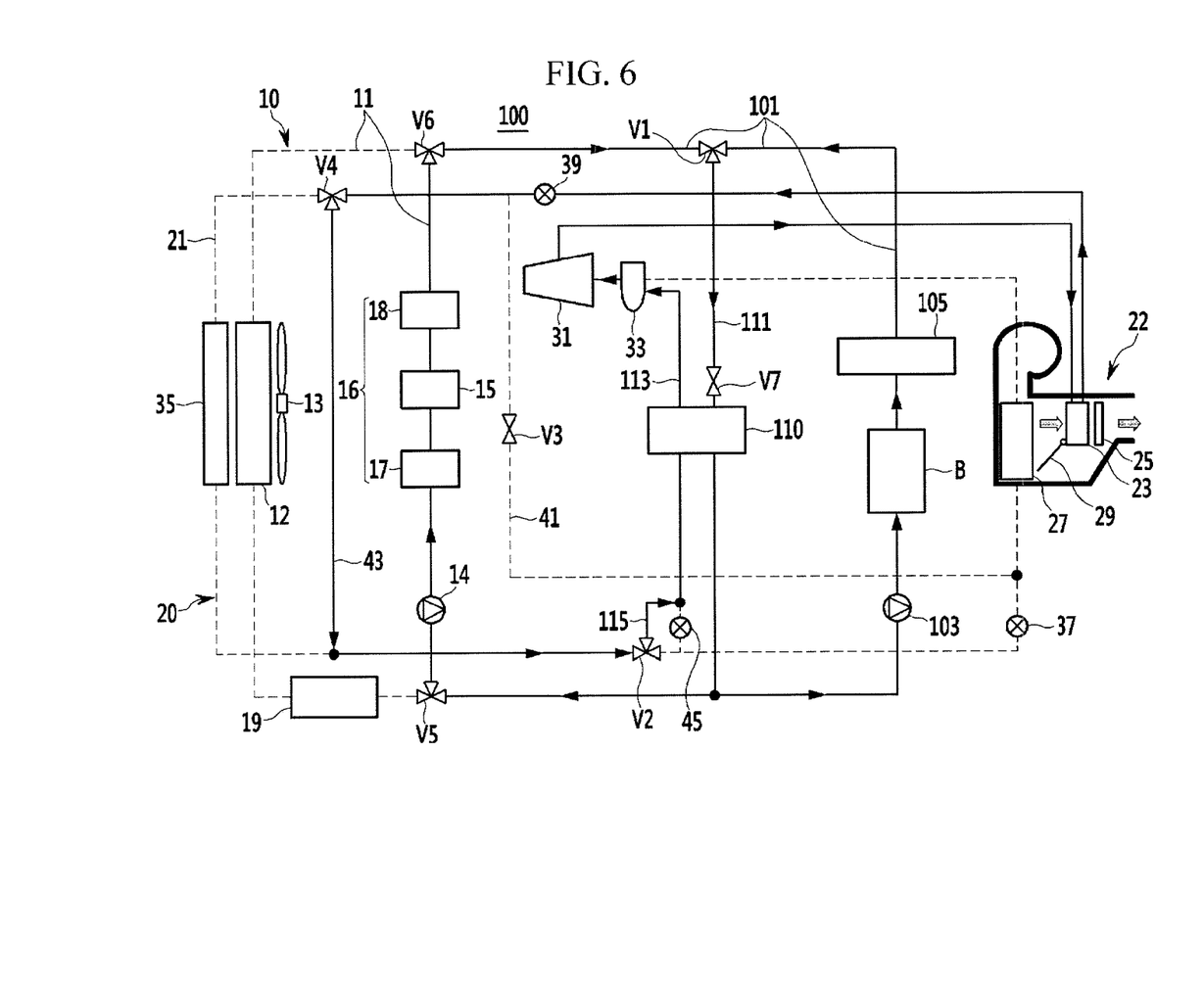
FIG. 6 is a block diagram illustrating an operation state upon recovering a waste heat in an electronic unit and a battery module according to a heating and defrosting mode of a vehicle in a heat pump system for the vehicle according to an exemplary embodiment of the present invention.

FIG. 6 is a block diagram illustrating an operation state upon recovering a waste heat in an electronic unit and a battery module according to a heating and defrosting mode of a vehicle in a heat pump system for the vehicle according to an exemplary embodiment of the present invention.

Here, when frost occurs in the external condenser 35, a defrosting mode operates.

Referring to FIG. 6, in a heating and defrosting mode of the vehicle, when recovering a waste heat of the battery module B, the motor 15, and the electronic unit 16, the first connection line 111, the bypass line 115, and the defrosting line 43 are opened through operation of the first, second, and third valves V1, V2, and V3.

The refrigerant line 21 and the dehumidification line 41 that are connected with the external condenser 35 are closed through operation of the third and fourth valves V3 and V4.

The fifth and sixth valves V5 and V6 close connection of the cooling line 11 such that the motor 15 and the electronic unit 16 are not connected with the radiator 12.

Simultaneously, the battery cooling line 101 and the cooling line 11 passing through the motor 15 and the electronic unit 16 are connected with the first connection line 111 through operation of the first, fifth, and sixth valves V1, V5, and V6.

Accordingly, coolant whose temperature is increased due to a waste heat that is generated in the motor 15 and the electronic unit 16 and a waste heat and that is generated in the battery module B is injected into the first connection line 111 through operation of the first and second water pumps 14 and 103 to pass through the chiller 110.

Here, the defrosting line 43 stops injection of a refrigerant into the external condenser 35 in which frost occurs and injects the refrigerant into the chiller 110 through the bypass line 115 and the second connection line 113, thereby defrosting while preventing frost increase in the external condenser 35.

In this case, operation of the first and second expansion valves 37 and 45 is stopped.

Therefore, a refrigerant that passes through the orifice 39 is injected into the bypass line 115 that is opened through operation of the second valve V2 without passing through the external condenser 35. Thereafter, a refrigerant is injected into the chiller 110 through the second connection line 113 and exchanges a heat with coolant whose temperature is increased in the chiller 110.

That is, a waste heat that is generated in the motor 15, the electronic unit 16, and the battery module B increases a temperature of the refrigerant in the chiller 110.

A refrigerant whose temperature is increased is injected into the compressor 31 by passing through the accumulator 33 is compressed to a state of a high temperature and a high pressure by the compressor 31 and is injected into the internal condenser 23.

The refrigerant line 21 that connects the first expansion valve 37 and the evaporator 27 is closed through operation of the second valve V2.

In such a state, the opening and closing door 29 is opened such that external air that is injected into the HVAC module 22 and that passes through the evaporator 27 passes through the internal condenser 23.

Accordingly, when external air that is injected from the outside passes through the evaporator 27 in which a refrigerant is not supplied, the external air is injected in a room temperature state that is not cooled. The injected external air is converted to a high temperature state while passing through the internal condenser 23 and is injected into a vehicle interior while passing through the selectively operating internal heater 25, thereby heating the vehicle interior.

Thereafter, the refrigerant is expanded while passing through the orifice 39 and is circulated while being again injected into the defrosting line 43.

In this case, the orifice 39 may operate as an expansion valve.

The heater 105 is selectively operated, as needed to heat coolant that is circulated in the battery cooling line 101. Accordingly, a temperature of a refrigerant passing through the chiller 110 quickly increases.

That is, the heat pump system 100 according to the present exemplary embodiment uses a waste heat occurring in the motor 15, the electronic unit 16, and the battery module B in a heating and defrosting mode of the vehicle in order to increase a temperature of a refrigerant, thereby reducing power consumption of the compressor 31 and improving heating efficiency.

Further, when frost occurs in the external condenser 35, by blocking inflow of a refrigerant through the defrosting line 43, the external condenser 35 may be more quickly defrosted.

In the present exemplary embodiment, in a heating mode of the vehicle, a waste heat of the motor 15, the electronic unit 16, and the battery module B is entirely recovered, but the present invention is not limited thereto and in a heating mode, a waste heat that is generated in the motor 15 and the electronic unit 16 and a waste heat that is generated in the battery module B may be selectively recovered.

Therefore, when applying a heat pump system 100 for a vehicle according to an exemplary embodiment of the present invention having the foregoing configuration, in an electric vehicle or a hybrid vehicle, by warming up or cooling a battery module B according to a vehicle mode using one chiller 110 in which a heat of a refrigerant and coolant is exchanged, the system can be simplified.

Further, as the battery module B is efficiently warmed up and cooled to correspond to a vehicle mode, an optimal performance of the battery module B can be exhibited, and an entire travel distance of the vehicle can increase through efficient management of the battery module B.

Further, by selectively using a waste heat of the motor 15, the electronic unit 16, and the battery module B, heating efficiency can be improved.

Further, through simplification of an entire system, a production cost can be reduced, a weight can be reduced, and space use can be improved.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures. The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A heat pump system for a vehicle, the heat pump system comprising:

a battery cooling line that is connected with a battery module and in which coolant moves;

a chiller that is connected with the battery cooling line through a first connection line to adjust a temperature of coolant by selectively exchanging a heat of a refrigerant and coolant that are injected therein and that is connected with a refrigerant line of an air-conditioner device through a second connection line;

a cooler comprising a radiator and a first water pump that are connected through a cooling line to circulate coolant for cooling a motor and an electronic unit connected to the motor in series and that is selectively connectable with the battery cooling line and the first connection line through a first valve; and a bypass line that selectively connects the second connection line and the refrigerant line through a second valve that is provided in the refrigerant line, wherein the air-conditioner device comprises:

a Heating, Ventilation, and Air Conditioning (HVAC) module that is connected through the refrigerant line and that has therein an opening and closing door that adjusts to selectively inject external air that passes through an evaporator into an internal condenser according to an air-conditioning mode, a heating mode, and a heating and dehumidification mode of the vehicle;

a compressor that is connected through the refrigerant line between the evaporator and the internal condenser;

an accumulator that is provided in the refrigerant line between the compressor and the evaporator;

an external condenser that is connected with the internal condenser through the refrigerant line and that is disposed at a front side of the vehicle;

a first expansion valve that is provided at the refrigerant line that connects the external condenser and the evaporator;

a dehumidification line having a first end that is connected with the refrigerant line between the internal condenser and the external condenser and having a second end that is connected with the refrigerant line between the evaporator and the first expansion valve and having a third valve;

a defrosting line that is connected with the refrigerant line between the external condenser and the first expansion valve through a fourth valve that is provided at the refrigerant line between the internal condenser and the external condenser; and a second expansion valve that is provided at the second connection line, wherein the bypass line is connected to the second valve and a portion of the second connection line by bypassing the second expansion valve, wherein the battery cooling line comprises:
- a fifth valve that connects the battery cooling line and the cooling line that connects the motor and the electronic unit between the radiator and the chiller; and
- a sixth valve that connects the battery cooling line and the cooling line that connect the motor and the electronic unit between the battery module and the radiator, wherein the first connection line and the bypass line are opened through operation of the first and second valves,
- the battery cooling line and the cooling line that connects the motor and the electronic unit are connected with the first connection line through operation of the first, fifth, and sixth valves,
- the dehumidification line is opened through operation of the third valve, and the defrosting line is closed through operation of the fourth valve,
- operation of the first and second expansion valves is stopped,
- when recovering a waste heat of the motor and the electronic unit in the heating and dehumidification mode of the vehicle, wherein the first connection line, the bypass line, and the defrosting line are opened through operation of the first, second, and third valves,
- the refrigerant line and the dehumidification line that are connected with the external condenser are closed through operation of the third and fourth valves,
- the battery cooling line and the cooling line that connects the motor and the electronic unit are connected with the first connection line through operation of the first, fifth, and sixth valves, and
- operation of the first and second expansion valves is stopped,
- when recovering a waste heat of the battery module, the motor, and the electronic unit in the heating and defrosting mode of the vehicle, wherein a seventh valve is provided in the first connection line directly between the first valve and the chiller, wherein a heater is directly mounted in the battery cooling line between the battery module and the chiller and aligned to be in series with the battery module, wherein the heater is turned on upon warming up the battery module to heat coolant circulating in the battery cooling line and to inject the coolant into the battery module, and wherein the heater is selectively turned on in a heating mode of the vehicle or a heating and defrosting mode of the vehicle to heat coolant circulating in the battery cooling line.

2. The heat pump system of claim 1, wherein the bypass line, the dehumidification line, and the defrosting line are closed through operation of the second, third, and fourth valves, and
the chiller is coupled in parallel to the evaporator and the external condenser,
when cooling the battery module in an air-conditioning mode of the vehicle.

3. The heat pump system of claim 1, wherein the bypass line, the dehumidification line, and the defrosting line are closed through operation of the second, third, and fourth valves, and
operation of the first expansion valve is stopped, and the second expansion valve is operated,
upon cooling the battery module using a refrigerant when an air-conditioning mode of the vehicle is not operated.

4. The heat pump system of claim 1, wherein the first and second connection lines and the bypass line are opened through operation of the first valve and the second valve,
the dehumidification line and the defrosting line are closed through operation of the third valve and the fourth valve, and
operation of the first and second expansion valves is stopped,
when recovering a waste heat of the battery module, the motor, and the electronic unit in a heating mode of the vehicle.

5. The heat pump system of claim 4, wherein the cooling line that connects the motor and the electronic unit is selectively connectable with the first connection line through operation of the first, fifth, and sixth valves.

6. The heat pump system of claim 1, wherein in the cooling line, a reservoir tank is provided between the radiator and the fifth valve.

7. The heat pump system of claim 1, wherein the first, second, fourth, fifth, and sixth valves are a 3-way valve that can distribute a flow rate.

8. The heat pump system of claim 1, wherein the second expansion valve is operated when cooling the battery module using an air-conditioning mode of the vehicle or a refrigerant, expands a refrigerant that is injected through the second connection line, and injects the refrigerant into the chiller.

9. The heat pump system of claim 1, wherein an orifice is provided in the refrigerant line between the internal condenser and the fourth valve.

10. The heat pump system of claim 9, wherein the orifice selectively opens and closes the refrigerant line or selectively expands a refrigerant passing through the refrigerant line.

11. The heat pump system of claim 9, wherein the dehumidification line is connected with the refrigerant line between the fourth valve and the orifice.

12. The heat pump system of claim 1, wherein the dehumidification line is opened through operation of the third valve in a heating and dehumidification mode of the vehicle.

13. The heat pump system of claim 1, wherein a second water pump is provided in the battery cooling line between the chiller and the battery module.

* * * * *